Figure 18:
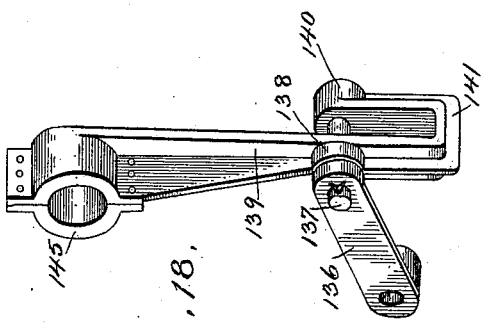

No. 713,157. Patented Nov. 11, 1902.
C. E. SANDSTROM.
MACHINE FOR MANUFACTURING PICTURE FRAMES.
(Application filed Mar. 12, 1902.)
(No Model.) 6 Sheets—Sheet 1.
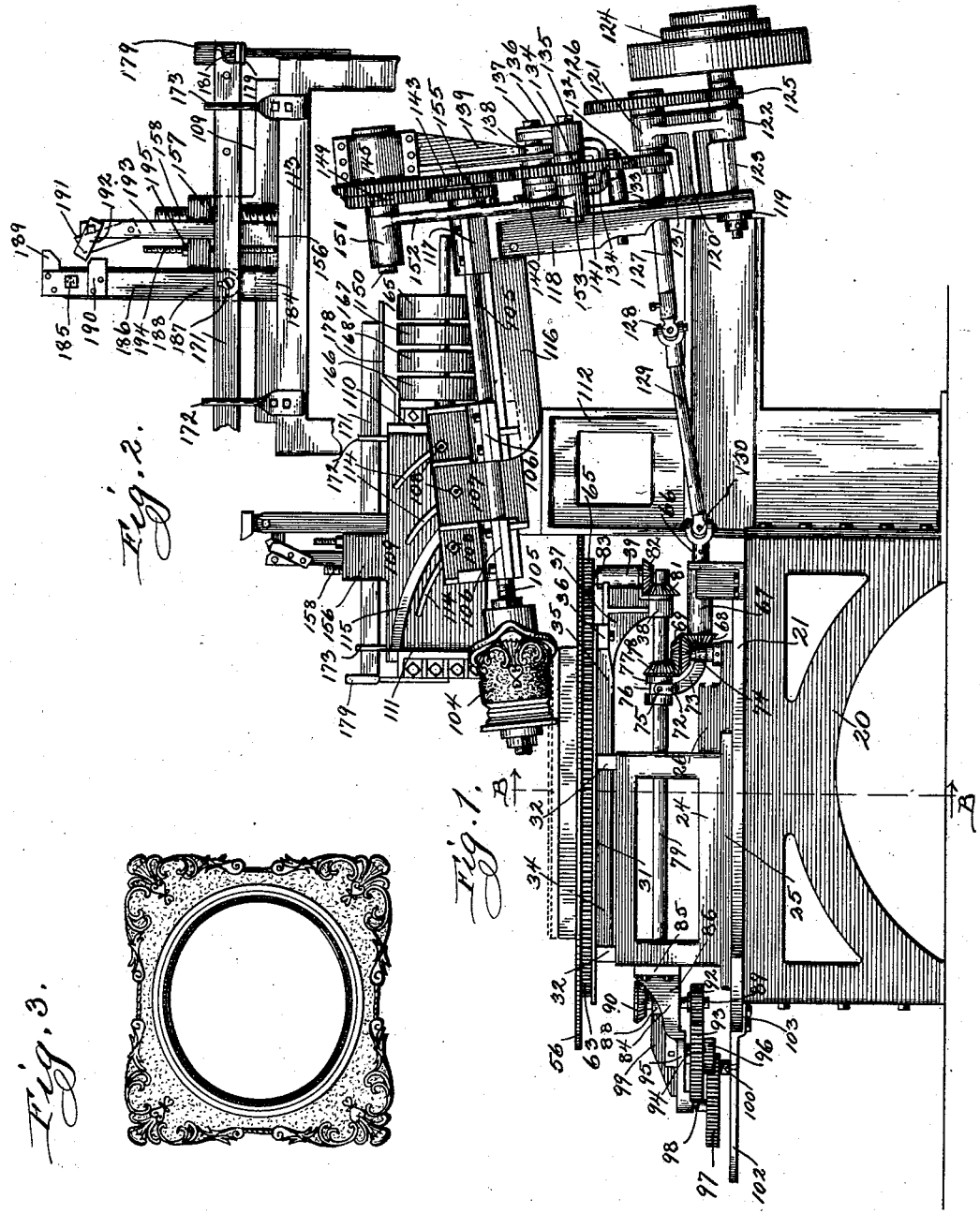

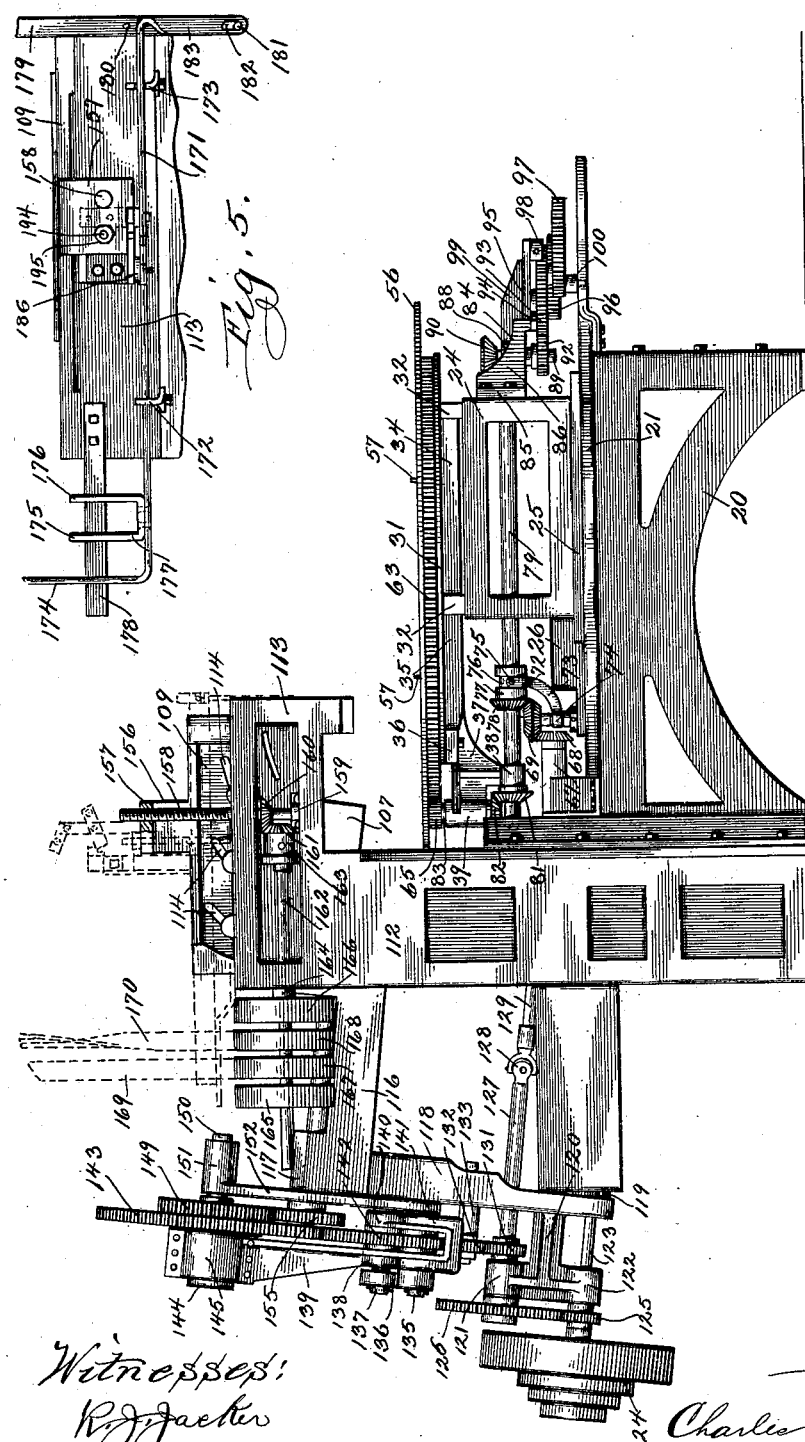

No. 713,157. Patented Nov. 11, 1902.
C. E. SANDSTROM.
MACHINE FOR MANUFACTURING PICTURE FRAMES.
(Application filed Mar. 12, 1902.)
(No Model.) 6 Sheets—Sheet 3.
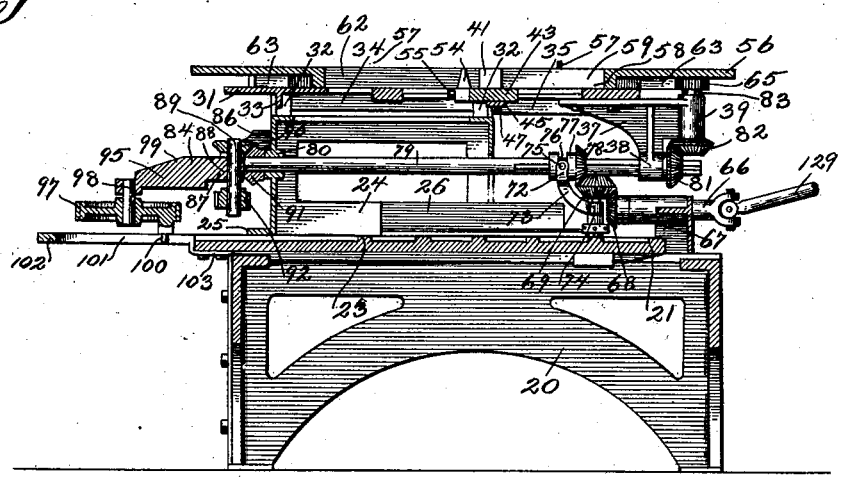
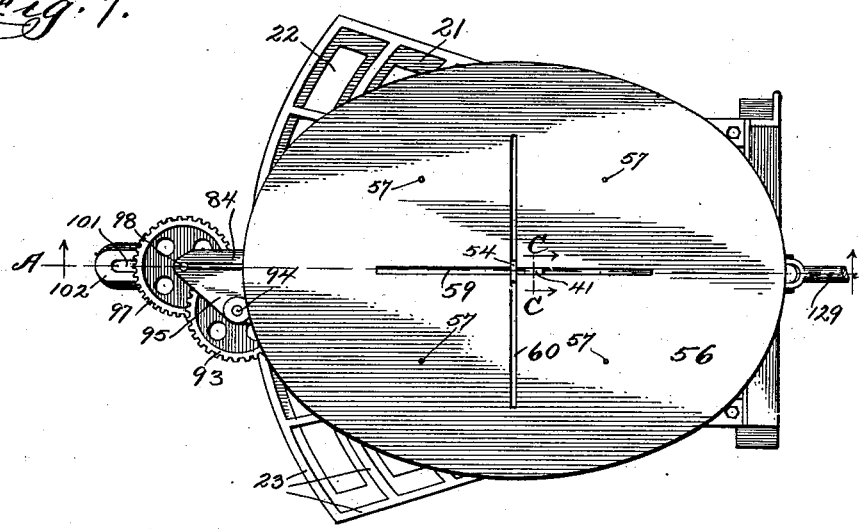
Witnesses:
R. J. Jacker
Hattie O. Halvorson.
Inventor:
Charles E. Sandstrom,
By Coburn, McRoberts & McElroy
Attys.
THE NORRIS PETERS CO., PHOTO-LITHO., WASHINGTON, D. C.

No. 713,157. Patented Nov. 11, 1902.
C. E. SANDSTROM.
MACHINE FOR MANUFACTURING PICTURE FRAMES.
(Application filed Mar. 12, 1902.)
(No Model.) 6 Sheets—Sheet 4.
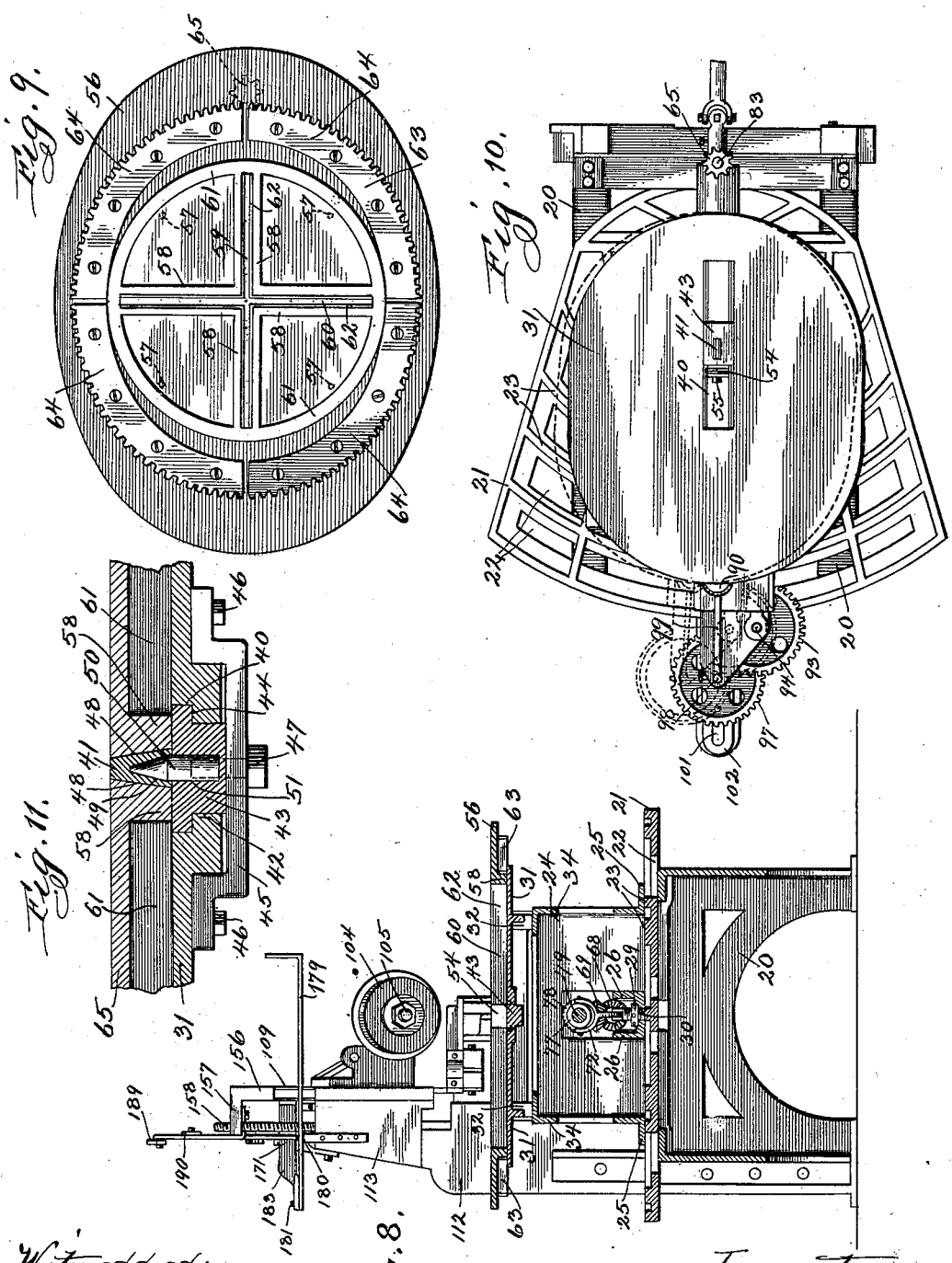
Witnesses:
R. J. Jacker
Hattie O. Halvorson.
Inventor:
Charles E. Sandstrom
By Coburn, McRoberts & McElroy
Attys.

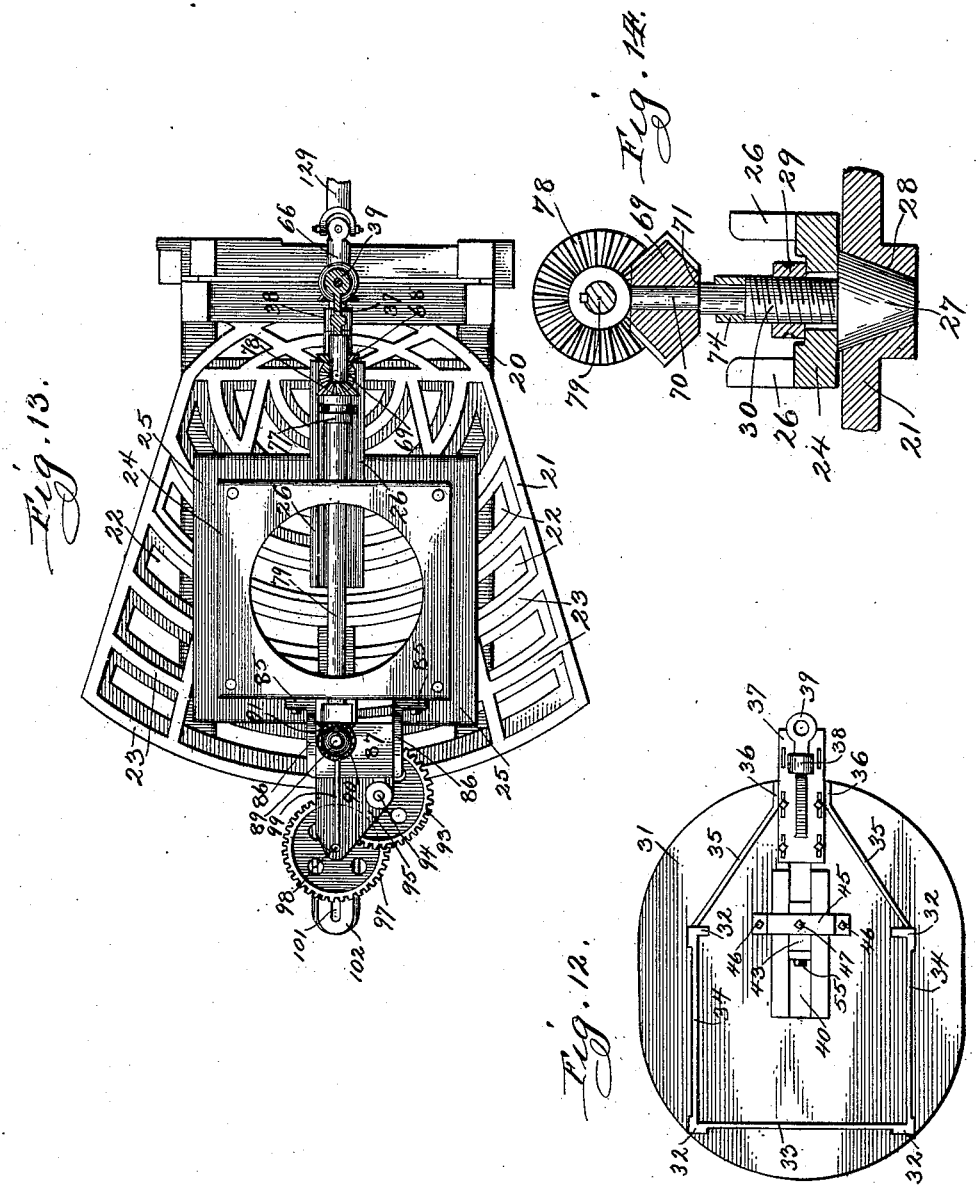

No. 713,157. Patented Nov. 11, 1902.
C. E. SANDSTROM.
MACHINE FOR MANUFACTURING PICTURE FRAMES.
(Application filed Mar. 12, 1902.)
(No Model.) 6 Sheets—Sheet 6.

Witnesses:
R. J. Jaeker
Hattie O. Halvorson

Inventor:
Charles E. Sandstrom,
By Coburn, McRobert & McElroy,
Attys.

THE NORRIS PETERS CO., PHOTO-LITHO., WASHINGTON, D. C.

UNITED STATES PATENT OFFICE.

CHARLES E. SANDSTROM, OF CHICAGO, ILLINOIS.

MACHINE FOR MANUFACTURING PICTURE-FRAMES.

SPECIFICATION forming part of Letters Patent No. 713,157, dated November 11, 1902.

Application filed March 12, 1902. Serial No. 97,962. (No model.)

*To all whom it may concern:*

Be it known that I, CHARLES E. SANDSTROM, a citizen of the United States, residing at Chicago, in the county of Cook and State of Illinois, have invented certain new and useful Improvements in Machines for Manufacturing Picture-Frames, of which the following is a specification.

In the manufacture of elliptical picture-frames where the interior and exterior edges are parallel a machine such as is shown in my application for Letters Patent, Serial No. 705,806, filed February 17, 1899, may be employed in applying the putty. In this machine the support for the frame is given a combined rotation and reciprocation, so as to carry the frame in an elliptical path beneath the rotating puttying-tool, and the puttying-tool is given a transverse vibration, so as to keep it always at right angles to the line of movement of the frame beneath it. In the machine for the same purpose shown in my application, Serial No. 26,347, filed August 9, 1900, the support for the frame is given the same rotation and reciprocation, so as to carry the frame through the elliptical path; but in addition it is given a swinging motion, which serves to keep the line of movement of the portion of the frame being operated upon always at right angles to the axis of the puttying-roller, so that it is not necessary to vibrate the roller, as in the first-mentioned application.

My present invention is designed to putty a frame having an elliptical inner edge, but an outer edge of a different shape—such, for instance, as a rectangle which has its longer and shorter sides of the same relative lengths as the major and minor axes of the ellipse constituting the inner edge. In a frame of this general outline to avoid the duplication of the design on the roller and the consequent expense of making so large and costly a roller it will be apparent that the puttying-roller must have a certain fixed number of rotations, and that with the rectangular form suggested to place the necessary design upon the roller four complete rotations of the roller will be necessary to ornament one frame, one rotation for each side, the designs on each of the rectangular sides of the frame being similar, except that on the shorter sides the design is relatively shorter than it is on the longer sides. To produce this effect on the frame with the roller containing a single design, it will be apparent that the frame-support must move relatively faster beneath the roller as the longer sides are decorated and relatively more slowly beneath it as the short sides are being decorated, the result being that the design on the long sides is drawn out, as it were, while it is shortened on the other sides. To adapt either of the machines shown in my above-mentioned applications for this purpose, it will be apparent that it is necessary to gear up the puttying-roller, so that while it during the complete operation on one frame moves in general synchronism therewith it will vary in its movement, so as to move faster than the frame during two alternate quarters of its complete movement and slower than the frame during the other two alternate quarters of its complete movement, or the same effect might be produced by gearing up the mechanism for rotating and reciprocating the frame-support, so that it will be moved at varying rates during the different rotations of the roller at a uniform rate. It will be apparent that the gearing for thus varying the relative rate of movement of the puttying-roller and frame-support can be applied to either form of machine above described; but in my present application I have shown it as applied to the form of machine shown in my application Serial No. 26,347 and for giving the varying rate to the puttying-roller, and in illustrating my invention I have described so much of the mechanism of that application as may be necessary to indicate the complete construction and operation of the machine as thus modified.

Referring to the accompanying sheets of drawings, in which the same reference characters are used to designate identical parts in all the drawings, Figure 1 is a side elevation of a complete machine containing my invention. Fig. 2 is a detached portion of the belt-shifting mechanism shown in Fig. 1 seen in elevation from the rear side of the machine. Fig. 3 is a plan view of the frame which the machine is designed to produce. Fig. 4 is a rear elevation of the machine. Fig. 5 is a top plan view of a portion thereof, showing the automatic belt-shifting mechanism. Fig.

Figure 16:
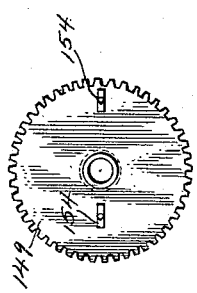
Figure 17:
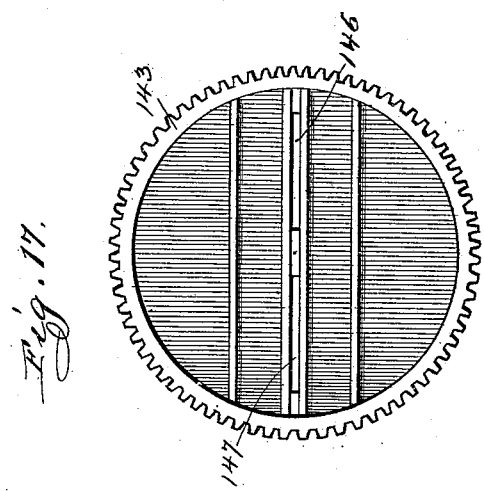
Figure 15:
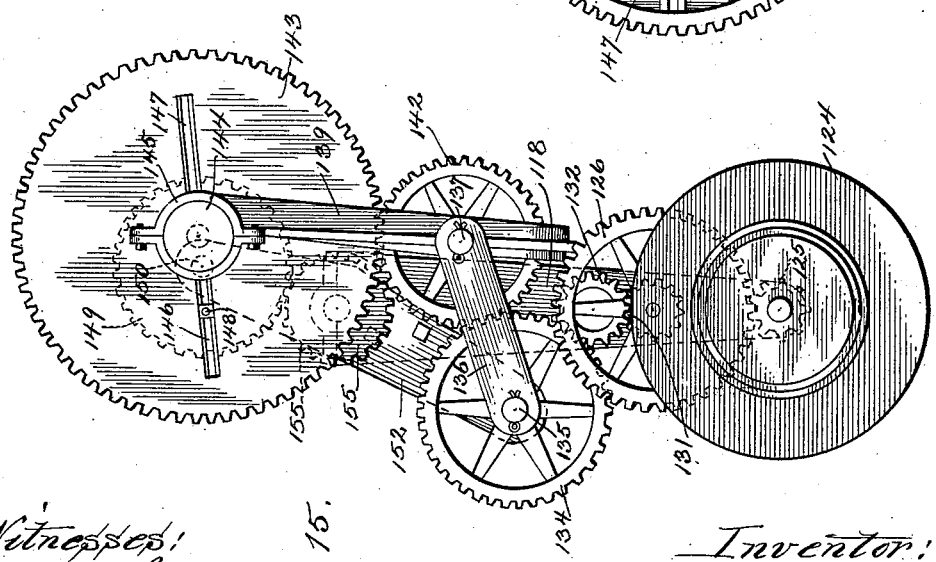

C is a vertical longitudinal section on the line A A of Fig. 7. Fig. 7 is a top plan view. Fig. 8 is a vertical section through the machine on the line B B of Fig. 1. Fig. 9 is an inverted plan view of the moving frame-support, the upper side of which is shown in Fig. 7. Fig. 10 is a top plan view of the swinging plate which carries the focal-point guides. Fig. 11 is an enlarged detail in section on the line C C of Fig. 7. Fig. 12 is an inverted plan view of the swinging plate shown in Fig. 10. Fig. 13 is a plan view of the machine, but with the swinging plate removed. Fig. 14 is an enlarged detail to be described. Fig. 15 is an end elevation of the variable gearing for driving the puttying-roller. Fig. 16 is a view of one of the gears shown in Fig. 15 seen from the other side. Fig. 17 is an elevation of the eccentric gear in the train of gearing shown in Fig. 9, and Fig. 18 is a perspective view of a swinging yoke-support.

The main portion of the machinery by which the necessary elliptical movement is given to the table which carries the frame is mounted upon the rectangular base 20, which for lightness is preferably formed of a comparatively thin shell supported by four legs, as clearly shown. Rigidly secured in any desired manner upon the top of this frame is the segmental grid 21, the upper portion of which constitutes a bearing-surface, which is planed down perfectly level. To lighten the same as well as to reduce the friction, as shown, it is made of a skeleton form, with the apertures 22 therein and the ribs 23 projecting above the main portion thereof and having their top surfaces planed down, as above described. Mounted to swing freely upon this grid is the supporting-frame 24, which, as will be seen by reference to Figs. 1, 4, 6, and 8, is of a generally rectangular shape and of a skeleton construction and having the horizontal flange 25 extending around its bottom edge. It has rigidly secured thereto, preferably by casting integrally therewith, the parallel ribs 26, extending from the center of the frame through its inner end to a substantially equal distance beyond the end. The shape of these ribs in cross-section is seen in Figs. 8 and 14, and together they form a way or channel by which the position of the frame is adjusted nearer to or farther from its pivotal support, as may be necessary in adjusting the machine for operating on different-sized frames. This pivotal support is best shown in the detail section constituting Fig. 14, where it will be seen to consist of an inverted truncated conical bearing-plug 27, pivotally seated in the correspondingly-shaped bearing-aperture 28, formed in the segmental grid 21. The frame after being adjusted to any desired position is then secured in place by screwing down the nut 29 upon the screw-threaded extension 30 of the bearing-plug, which extension projects upwardly between the ribs 26. The nut 29 when thus adjusted securely clamps the ribs 26, and consequently the frame 24, to the bearing-plug 27, so that the frame can vibrate back and forth upon the grid 21 about this bearing-plug as a center, as indicated by the dotted-line position in Fig. 10. The upper side of this frame 24 is shown in plan view in Fig. 13, and preferably has its center cut away, as shown, to give ready access to the parts inside or beneath it. Rigidly secured upon the top of this swinging frame 24 is the plate 31, which swings therewith and a convenient shape of which is shown in the plan view constituting Fig. 10. Its upper surface is planed down smooth to furnish a bearing for the rotating and reciprocating table, to be mentioned, and its under side has projecting downwardly therefrom the angular projections 32, which rest upon the upper surface of the frame 24, to which they are rigidly secured by bolts or otherwise. The outermost posts 32 are connected by the downwardly-projecting flange or rib 33, while its side posts are connected by the similar flanges 34, which continue from the inner posts, as shown in Fig. 12, at an angle, forming the ribs 35, which terminate in the horizontal ribs 36. Bolted or otherwise rigidly secured to the under side of the plate 31, between the ribs 36, is the bracket 37, which is of the general shape shown in Figs. 1, 6, and 12 and which has a horizontal journal-bearing 38 secured to its lowermost portion and a vertical journal-bearing 39 secured to its innermost portion, these bearings being adapted to receive shafts to be hereinafter described.

Referring now especially to Fig. 10, the swinging plate 31 has extending longitudinally thereof the rectangular slot 40, in which the focal bearing 41 is adjustably mounted. As best shown in the detail of Fig. 11, the plate adjacent to the rectangular slot 40 is thickened and has the shoulders 42 projecting into the slot, so as to form a guideway, along which the block 43, in which the focal bearing 41 is mounted, can be adjusted. This block 43 is provided with the shoulders 44, resting on the shoulders 42, and the block is secured in any desired position of adjustment by means of the strap 45, which is arranged to be secured by the bolts 46 at any desired position along the slot 40. The upper surface of the strap 45 does not quite come in contact with the bottom of the shoulders 42, so that the screw or bolt 47, passing through the center of the strap and screwing into the block 43, will operate to draw said block down upon the shoulders 42 and securely clamp it in place. The focal bearing 41 consists of the elongated rectangular block, with its top narrower than its bottom and its sides 48 sloping down, as clearly shown in Fig. 11. This block has the conical recess 49 in its under side, into which the conical end of the pivot 50 passes, the cylindrical lower end of said pivot resting in the recess 51, formed in the block 43. With this construction it will be apparent that the focal bearing 41 can be turned freely about its pivot 50, so as to assume any angle relative to the plate. Toward the outer end of the slot 40, at the necessary point and upon any convenient part, such as the block 43, is mounted the other focal bearing 54, which is mounted upon a similar pivot secured in a similar recess and held in place, if deemed necessary, by the set-screw 55. Any desired means of adjustment or mounting may be employed to vary the distance between these focal bearings which constitute the foci of the ellipse, so that the machine is adapted to operate on ellipses having different equations. Resting on this swinging plate 31 is the frame support or table 56, upon which the frame to be operated upon is secured by some means, such as the pins 57, projecting upwardly therefrom at certain fixed positions, as seen in Fig. 7. This plate 56 consists of a preferably elliptical plate, having the four angular flanges 58 projecting downwardly from the under side thereof and forming the boundaries of the slots 59 and 60, which cross each other at right angles, as shown. The flanges 58 may be connected by the circular flange 61, and the inner edges 62 of said flanges 58, bounding the slots 59 and 60, are constructed at the same angle to the vertical as are the inclined sides of the focal bearings 41 and 54, with which they coöperate. This table has also secured on the under side thereof the elliptical rack 63, which is conveniently made of four separate sections 64, which are screwed to the under side of the table, as shown. This rack 63 has to be changed where frames having ellipses of different equations are to be made. If now the table be rotated, as by means of the pinion 65, which meshes with the rack 63, disregarding for the present any swinging motion given to the plate 31, the table will be moved so that any point of it will pass through an ellipse, the focal bearings 41 and 54 coöperating with the slots 59 and 60 to compel this elliptical movement, their operation being exactly the reverse of that of the well-known ellipsograph, in which the focal points are movable, while the frame is stationary.

To rotate the table, I provide the shaft 66, which is journaled in the bearing 67, secured upon the framework, as seen in Figs. 1, 4, and 6, and driven by means to be hereinafter described. This shaft has secured upon its outer end the bevel gear-pinion 68, which meshes with the idle double-bevel gear-pinion 69, which is loosely journaled on the bearing 70, formed on the upper end of the screw-threaded portion 30 of the pivotal bearing 27, previously described, as shown in Fig. 14, a shoulder 71 being formed on the bottom of said bearing portion to support the idle bevel-pinion. A yoke 72 has its support 73 curved, as shown in Fig. 1, and terminated by a collar 74, which is secured about the bearing 70 beneath the idle double-bevel gear-pinion 69. The pins 75 on the yoke 72 take into the annular groove 76, formed in the sleeve 77, which terminates in the bevel gear-pinion 69. The sleeve 77 is splined to the elongated horizontal shaft 79, which is mounted at one end in the bearing 38, previously mentioned, and at the other end in the bearing 80, formed in the outer end of the swinging supporting-frame 24. The inner end of the shaft 79 has the bevel gear-pinion 81 likewise splined thereon, the object of these splines being to permit the movement of the shaft 79 in the bevel-gears 78 and 81, so that the frame 24 can be adjusted, as previously mentioned, for changing the size of the ellipses upon which the machine operates. The bevel gear-pinion 81 meshes with the bevel gear-pinion 82, which terminates the lower end of the vertical shaft 83, which is mounted in the bearing 39, previously referred to, and has the pinion 65, previously referred to, secured at its upper end, so that it will be seen that as the power is applied to the shaft 66 it will be transmitted eventually to the pinion 65, so as to rotate the same, thus insuring the movement of the table through an ellipse by the mechanism previously mentioned.

As with the construction herein shown the forming-tool is not vibrated, as in my prior application, Serial No. 705,806, above referred to, to compensate for the axis of the cutting-tool not being always exactly at right angles to the line of movement arrangements are made to vibrate the table 56 itself during each rotation thereof, so that the line of movement of the frame on the table will always be at right angles to the axis of the forming-tool. This vibration is secured by vibrating the swinging frame 24 and its annexed plate 31 about the pivotal bearing 27, previously described. This vibration must be of a certain extent and synchronous with the rotary elliptical movement of the table, and the following mechanism is employed to secure it: Secured upon the outer end of the frame 24, as best shown in Figs. 1 and 13, is a bracket 84, which consists of two vertical flanges 85, projecting therefrom, the webs in turn being connected by a web 87. Formed in this web 87 is the vertical journal-bearing 88, in which is mounted the short vertical shaft 89, which has the bevel gear-pinion 90 secured to its upper end and meshing with the corresponding bevel gear-pinion 91, mounted upon the outer end of the shaft 79. The lower end of the shaft 89 has secured thereon the gear-pinion 92, which, as will be best seen from Fig. 1, meshes with a gear-wheel 93, which is mounted upon the short vertical bearing or pintle 94, projecting downwardly from the extension 95 of the bracket 84. This gear-wheel 93 has secured on the under side thereof the gear-pinion 96, which in turn meshes with the gear-wheel 97, mounted upon a depending stub shaft or pintle 98, projecting downwardly from the outer end of the extension 95 of the bracket 84. A vertical rib 99, extending from the bearing 88 out to the support of the pintle, serves to strengthen the bracket. The gear-wheel 97 has projecting from the under side thereof a pin or lug 100, which extends into the elongated way 101, formed in the arm or piece 102, which has its inner end 103 bolted to the under side of the grid, as shown in Fig. 5.

By a study of the mechanism thus described it will be seen that as the table 56 is rotated and reciprocated to cause it to move in an ellipse the train of gearing connected to the shaft 79 will cause the gear-wheel 97 to be rotated slowly, and inasmuch as it has the pin 100 rigidly secured thereto and projecting into the way 101, which confines it, the pin will be slid back and forth from one end of the way 101 to the other end, and to permit this movement the wheel 97, and consequently the frame 24 and all the superposed parts, must be swung first to the right and then to the left, as indicated by the dotted-line position in Fig. 10. This swinging movement serves to compensate exactly for the vibration that would otherwise exist in the line of movement of the frame from the position at right angles to the axis of the forming-tool.

The puttying-roll 104, by which the design is formed on the frame, has its outer surface of the necessary shape to produce by a single rotation thereof one-quarter of the design on the surface of the frame shown in Fig. 3. This puttying-roll is secured on the outer end of the shaft 105, which is journaled in the bearings 106, formed on the frame 107, which is secured at any necessary angle by the bolts 108 to the sliding plate 109, which is mounted to be raised and lowered in the ways 110 and 111, formed on the rear edge of the column 112, secured to the frame 20, and on the front edge of the horizontal extension 113 of said column at the top thereof. This plate 109 has formed therein the concentrically-curved slots 114, through which the bolts 108 pass and by which the plate 107 can be secured in any desired position of adjustment to bring the shaft 105 at any desired angle to the plane of the frame-support. A rib 115, concentric with the slots 114, may be employed to coöperate with a corresponding groove (not shown) formed in the rear side of the frame 107. The frame 107 has secured on the under side thereof or formed integrally therewith an arm 116, which constitutes an extension thereof parallel to the shaft 105 and has on the outer end thereof another journal-bearing 117, in which the outer end of the shaft 105 is mounted. This bracket 116 has an extension 118 thereof projecting downwardly from its outer end and at right angles thereto. The lower end of the extension 118 has formed therein the journal-bearing 119, and just above this bearing is a T-shaped projection 120, extending horizontally therefrom and having the bearings 121 and 122 formed in the ends thereof, the bearings 122 and 119 being in alinement and supporting the shaft 123, mounted therein, which has the pulley-wheels 124 secured on the outer end thereof, either directly or by other intermediate clutch connections. Between the pulley-wheels 124 and the bearing 122 is mounted a gear-pinion 125, which rotates with the belt pulley-wheels 124 when the machine is in operation. This gear-pinion 125 meshes with a gear-wheel 126, secured upon the outer end of a shaft 127, journaled in the bearing 121 and having its inner end connected by a universal joint 128 with the extensible link 129, which is connected by the universal joint 130 with the shaft 66, previously described. This extensible link 129 is of any customary construction, such as a sleeve surrounding a rod to which it is splined. Between the bracket 118 and the bearing 121 a gear-pinion 131 is secured to the shaft 127 and meshes with an idle gear-pinion 132, mounted upon a bearing-stud 133, projecting outwardly from the bracket 118. This idle pinion 132 meshes with a gear-wheel 134, which is journaled upon a bearing-stud 135, secured in the outer end of a swinging arm 136, which is pivoted upon the bearing-stud 137, extending through the bearing 138, formed on the swinging support 139, and in the bearing 140, formed on the end of the U-shaped extension 141 on the bottom thereof. The gear-wheel 134 meshes with a gear-wheel 142, mounted on the bearing-stud 137 between the bearings 140 and 138. This gear-wheel 142 in turn meshes with a large eccentric gear-wheel 143, the hub 144 of which is journaled in the large bearing 145, formed on the upper end of the support 139. This eccentric gear-wheel 143 has formed in the web thereof the radial slots 146 and 147, by which it is secured eccentrically by means of bolts 148 to the gear-wheel 149 on the bearing-shaft 150, mounted in the bearing 151, formed on the upper end of a support 152, which has at its lower end the bearing 153, which supports one end of the bearing-stud 135, upon which the wheel 134 and the arm 136 are mounted. This support 152 is secured to or formed integrally with the bracket 118. The gear-wheel 149 has the eccentric lugs 154, formed in the web thereof, through which the bolts 148 are passed to clamp the large eccentric gear-wheel 143 to the gear-wheel 149. The gear-wheel 149 meshes with a smaller gear-wheel 155, secured upon the outer end of the shaft 105.

By a careful study of the mechanism just described it will be seen that as power is applied to the pulley-wheels 124 the shaft 127 and through the mechanism shown the gear-pinion 65 will be rotated at a uniform rate of speed, causing the frame-support to move through its elliptical path at a uniform lineal rate. The train of gearing also serves to rotate the eccentric wheel 143 at a uniform rate of speed; but as it is eccentrically secured to the gear-wheel 149 the shaft 105, carrying the puttying-roller, will be rotated at a varying rate of speed owing to the relative eccentricity of the gear-wheels 143 and 149. The bearing-supports for the gear-wheels 134, 142, and 143 are such as will permit the eccentric wheel 143 to gyrate about the bearing-shaft 150 and still remain in mesh. When ellipses of different equations are to be operated upon, the eccentric gear-wheel 143 is suitably adjusted relative to the gear-wheel 149 by increasing or diminishing the eccentricity thereof by means of the slots 146 and 147. During one half of the rotation of the wheel 143 it will be apparent that the rate of movement of the gear-wheel 149, and consequently of the puttying-roller 104, will be greatly increased, while during the next half the rate will be correspondingly decreased. By means of this variation I am enabled to produce the necessary drawing out of the design over the long sides of the frame and the shortening thereof over the short sides.

As it is necessary to raise and lower the puttying-roll 104 at the completion of the frame, I preferably provide means whereby it can be raised and lowered automatically whenever desired by the operator. For this purpose the reciprocating support 109 has an upward extension 156, which has the overhanging flange 157 projecting rearwardly therefrom, and this flange has a screw-threaded aperture therein, through which passes the screw-threaded shaft 158, which, as best shown in Figs. 2 and 4, is journaled in the bearing 159, formed in the extension 113 of the frame. This shaft 158 has rigidly secured thereon the bevel-pinion 160, which meshes with the bevel-pinion 161, secured upon the end of the horizontal shaft 162, which is journaled at one end in the bearing 163, secured upon the extension 113 of the frame, and at the other end in the bearing 164, formed in the end of the frame. This shaft 162 has rigidly secured upon it two belt-pulleys 165 and 166, and loosely mounted thereon between them are the idle belt-pulleys 167 and 168. Two belts 169 and 170, (shown in dotted lines in Fig. 4,) running from the same shaft, are adapted to coöperate with the belt-pulleys 165 and 166, respectively, the belt 170 being crossed, so that when it coöperates with its pulley 106 the shaft 162 will be rotated in one direction, and while the belt 169 coöperates with its pulley 165 the shaft will be rotated in the opposite direction. It will be apparent that when one belt engages with its belt-pulley the other will be upon one of the idle pulleys, and it will also be apparent that both of these belts may be engaged with the idle pulleys 167 and 168, in which intermediate position the shaft 162 will not be moved in either direction, but will stand still. To control the direction of movement of the shaft 162 and the consequent upward and downward movement of the frame 109, I employ the belt-shifting bar 171, which is best illustrated in Figs. 1, 2, 4, and 5. This bar 171 is mounted to slide freely back and forth in the ways 172 and 173, secured upon the top of the framework, and has its outer end projecting forwardly at right angles to the main body of the bar, forming the arm 174, while the parallel arms 175 and 176 may be formed thereon by bolting thereto the U-shaped piece 177, all these arms being supported by the bracket 178, bolted to the top of the frame in the manner clearly shown in Figs. 1 and 5. These arms 174, 175, and 176 form two yokes, which embrace the belts 169 and 170, so that when the bar is swung to the extreme left the belt 169 will engage with the pulley 165 to rotate the shaft 162 in one direction, while when the bar 171 is swung to its farthest position to the right the belt 170 will engage the belt-pulley 166 to rotate the shaft 162 in the other direction, while when the bar 171 is in its intermediate position the belts 169 and 170 will engage the idle pulleys 167 and 168, respectively, so that the shaft 162 will not be moved in either direction. An operating-handle 179 is pivoted to the top of the frame, as at 180, and has a pin 181 projecting upwardly from the rear end thereof and engaging with the slightly-elongated slot 182 in the arm 183, which projects rearwardly from the right-hand end of the bar 171. By this construction it will be apparent that the operator by swinging the lever 179 to either side of the central position can cause the plate 109 to be raised or lowered, as desired, or by leaving it in intermediate position can cause the plate to stop in any desired position.

In order to prevent any possibility of marring the work by lowering the puttying-tool too far down or of damaging the machine by permitting the plate 109 to move too far up, I provide automatic means for controlling the movement of this shifting-bar 171 and by that means the movement of the frame. As will be best seen in Fig. 2, I secure to the top of the framework the standard 184 and pivot thereto at 185 a lever 186, which has its lower end connected to the bar 171 by the pin or set-screw 187 passing through the slot 188 in said bar. Above and below the pivotal point 185 and upon opposite sides of the lever 186 I secure the cam-lugs 189 and 190, which are arranged to be struck, respectively, by the cam-lugs 191 and 192, respectively, which are adjustably secured to and moved with the post 193, secured to the flange 157 upon the top of the plate 109. From a consideration of the arrangement of the parts shown in Fig. 4 it will be readily seen that the parts as therein shown are in position to rest with the bar 171 at its intermediate position. If now the bar be moved to the right and the screw 158 is rotated so as to carry the plate 109 downward, the lug 192 will contact almost immediately with the lug 190, so as to swing the bar 171 back to its neutral position and stop the machine, the parts being shown at substantially the limit of their downward movement. If now the bar 171 be swung to the left, so as to rotate the screw 158 in the direction to raise the plate, the cam-lug 189 will be rocked over into the path of the lug 191, which as soon as the plate 109 has been raised to the required distance will contact with the said lug 189 and shift the lever 186 and the bar 171 back to its initial position, so as to stop the upward movement of its plate 109.

If desired, a set-screw or bolt 194 may be secured through the flange 157 and have the locking-nut 195 thereon, by which it may be adjusted in position so that its lower end will contact with the stop of the frame as the downward movement of the plate 109 is stopped and by this resistance to compression tend to immediately check the movement of the screw 158 and the shaft 162 and its associated parts, the momentum of which is thus instantly overcome.

While I have herein shown my invention as applied to the type of machine in which the line of movement of the frame-support beneath the puttying-roller is kept at right angles thereto by swinging the frame-support, it will be apparent that it can be applied to that type of machine in which the roller is swung instead of the frame. It will also be apparent that the invention might be applied to either one of these two types of machine by causing the rate of movement of the frame-support to be varied instead of that of the puttying-roller, while still retaining the ultimate synchronism of the parts. Consequently while I have shown my invention as embodied in the form which I at present consider best adapted to carry out its purposes it will be understood that it is capable of wide modifications and that I do not desire to be limited in the interpretation of the following claims, except as may be necessitated by the state of the art, which, so far as I am advised, shows no construction having the same purpose as my present invention.

What I claim as new, and desire to secure by Letters Patent of the United States, is—

1. In a device of the class described, the combination with the rotating forming-tool, of the frame-support moving in an elliptical path beneath said forming-tool, and means for rotating said forming-tool and moving said frame-support in its elliptical path in ultimate synchronism while varying their relative rates of movement for the purpose described.

2. In a device of the class described, the combination with the rotating forming-tool, of the frame-support moving in an elliptical path beneath said forming-tool and means for rotating said forming-tool and moving said frame-support in its elliptical path in ultimate synchronism while varying their relative rates of movement for the purpose described and for changing their relative positions as the frame moves beneath the tool so that the axis of the tool is always at right angles to the line of movement of the portion of the frame passing beneath it.

3. In a device of the class described, the combination with the rotating forming-tool, of the frame-support moving in an elliptical path beneath said forming-tool, and means for moving said frame in an elliptical path at a uniform rate of speed, while rotating the tool at a varying rate of speed for the purpose described although in ultimate synchronism with the movement of said frame-support.

4. In a device of the class described, the combination with the rotating forming-tool, of the frame-support moving in an elliptical path beneath said forming-tool, and means for moving said frame in an elliptical path at a uniform rate of speed, while rotating the tool at a varying rate of speed for the purpose described although in ultimate synchronism with the movement of said frame-support and for changing their relative positions as the frame moves beneath the tool so that the axis of the tool is always at right angles to the line of movement of the portion of the frame passing beneath it.

5. In a device of the class described, the combination with the rotating forming-tool, of the frame-support moving in an elliptical path beneath said forming-tool, and means for rotating said forming-tool and moving said frame-support in its elliptical path in ultimate synchronism while varying their relative rates of movement for the purpose described and for swinging said frame as it moves beneath the tool so that the axis of the tool is always at right angles to the line of movement of the portion of the frame passing beneath it.

6. In a device of the class described, the combination with the rotating forming-tool, of the frame-support moving in an elliptical path beneath said forming-tool, and means for moving said frame in an elliptical path at a uniform rate of speed, while rotating the tool at a varying rate of speed for the purpose described although in ultimate synchronism with the movement of said frame-support and for swinging said frame as it moves beneath the tool so that the axis of the tool is always at right angles to the line of movement of the portion of the frame passing beneath it.

7. In a device of the class described, the combination with the rotating forming-tool, of the frame-support adapted to move in an elliptical path beneath said tool, means to move said frame in said elliptical path at a uniform rate of speed, and means for rotating said tool in ultimate synchronism with the frame-support but at varying speeds for the purpose described.

8. In a device of the class described, the combination with the rotating forming-tool, of the frame-support adapted to move in an elliptical path beneath said tool, a single power-shaft for driving said tool and frame-support, and variable gearing between said tool and frame-support whereby said parts are moved in ultimate synchronism while varying their relative rates of movement for the purpose described.

9. In a device of the class described, the combination with the rotating forming-tool, of the frame-support adapted to move in an elliptical path beneath said tool, a single power-shaft for driving said tool and frame-support, and variable gearing between said tool and frame-support whereby said parts are moved in ultimate synchronism while varying their relative rates of movement for the purpose described, said gearing including a gear-wheel in the train eccentrically secured to another gear-wheel and meshing with a third gear-wheel mounted in a swinging support so that said first-mentioned gear-wheel can gyrate about the axis of said second-mentioned gear-wheel as a center without disengaging the train.

10. In a device of the class described, the combination with the rotating forming-tool, of the frame-support adapted to move in an elliptical path beneath said tool, a single power-shaft for driving said tool and frame-support, and variable gearing between said tool and frame-support whereby said parts are moved in ultimate synchronism while varying their relative rates of movement for the purpose described, said gearing including a gear-wheel in the train eccentrically and adjustably secured to another gear-wheel and meshing with a third gear-wheel mounted in a swinging support pivoted concentrically with the axis of the first-mentioned gear-wheel so that said first-mentioned gear-wheel can gyrate about the axis of the second-mentioned gear-wheel as a center without disengaging the gearing of the train.

In testimony whereof I affix my signature in presence of two witnesses.

CHARLES E. SANDSTROM.

Witnesses:
HATTIE O. HALVORSON,
R. K. GUSTAFSON.